United States Patent
Vikinski et al.

(10) Patent No.: US 9,996,127 B2
(45) Date of Patent: Jun. 12, 2018

(54) METHOD AND APPARATUS FOR PROACTIVE THROTTLING FOR IMPROVED POWER TRANSITIONS IN A PROCESSOR CORE

(71) Applicant: Intel Corporation, Santa Clara, CA (US)

(72) Inventors: Omer Vikinski, Haifa (IL); Igor Yanover, Yokneam Illit (IL); Gavri Berger, Haifa (IL); Gabi Malka, Haifa (IL); Zeev Sperber, Zihron Ya'akov (IL)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 14/207,074

(22) Filed: Mar. 12, 2014

(65) Prior Publication Data
US 2015/0261270 A1 Sep. 17, 2015

(51) Int. Cl.
| G06F 1/00 | (2006.01) |
| G06F 1/26 | (2006.01) |
| G06F 1/28 | (2006.01) |
| G06F 1/32 | (2006.01) |
| G06F 9/50 | (2006.01) |

(52) U.S. Cl.
CPC ............ *G06F 1/26* (2013.01); *G06F 1/28* (2013.01); *G06F 1/329* (2013.01); *G06F 9/5094* (2013.01); *Y02D 10/24* (2018.01)

(58) Field of Classification Search
CPC ...... G06F 11/3024; G06F 1/26; G06F 1/3203; G06F 1/3206; G06F 1/3243; G06F 1/329; G06F 2201/86
See application file for complete search history.

(56) References Cited

U.S. PATENT DOCUMENTS

| 7,230,925 | B2* | 6/2007 | Li | H04L 47/10 370/237 |
| 8,816,757 | B1* | 8/2014 | Yabbo | G06F 1/30 327/538 |
| 2005/0188235 | A1* | 8/2005 | Atkinson | G06F 1/3203 713/330 |
| 2010/0325394 | A1* | 12/2010 | Golla | G06F 9/3836 712/208 |
| 2013/0227326 | A1* | 8/2013 | Gwak | G06F 1/3287 713/324 |
| 2014/0157033 | A1* | 6/2014 | Eisen | G06F 1/26 713/340 |
| 2014/0157277 | A1* | 6/2014 | Eisen | G06F 1/26 718/102 |

(Continued)

*Primary Examiner* — Thomas Lee
*Assistant Examiner* — Zhipeng Wang
(74) *Attorney, Agent, or Firm* — Nicholson De Vos Webster & Elliott LLP

(57) ABSTRACT

A processor and method are described for performing proactive throttling of execution unit ports. For example, one embodiment of a processor core comprises: a plurality of execution unit ports within an execution stage of the processor core; a scheduler unit to schedule execution of a plurality of operations to the plurality of execution unit ports; and proactive throttling logic to limit acceleration of execution of the operations by the ports to an acceleration level which does not result in significant power supply droops.

19 Claims, 13 Drawing Sheets

(56) References Cited

U.S. PATENT DOCUMENTS

2014/0281082 A1* 9/2014 Bagger ................ G06F 1/26
                                                710/110
2015/0089198 A1* 3/2015 Sommers .............. G06F 9/3836
                                                712/214

* cited by examiner

METHOD AND APPARATUS FOR PROACTIVE THROTTLING FOR IMPROVED POWER TRANSITIONS IN A PROCESSOR CORE

BACKGROUND

Field of the Invention

This invention relates generally to the field of computer processors and software. More particularly, the invention relates to a method and apparatus for implementing proactive throttling of operations in a processor core to improve transitions between different power usage levels.

Description of the Related Art

Current core architectures (e.g., such as Intel Architecture (IA) cores) can switch very rapidly from low power activity to a high power activity. By way of example, a core may very quickly change from performing just one or a few microoperations (uOps) in period of time to many uOps over the same period of time based on fluctuations in the instruction stream. Such instantaneous load transition can cause excessive supply droops in real systems which may result in logic failures in the core logic critical paths, thereby limiting the performance of the chip.

FIG. 8 show an example of a simulated code trace current load 801 (equivalent in the present application to instantaneous power consumption) over time and a corresponding supply voltage fluctuations 802. The code in the illustrated example produces fast transients between low power code interrupts and high power code sections (termed "power virus" as they are designed to produce the maximum power from the core pipeline).

As can be seen from the figure, fast transitions of current load/power 801 induce noises in the supply voltage 802. In particular, a power supply "hazard droop" results in response to the transition between the low power interrupt and the high power virus code. In other words, the voltage source is unable to supply the needed voltage quickly enough to account for the increased load/power requirements of the high power virus code, potentially resulting in logic failures and/or decreased performance. Empirical testing (i.e., probing of the voltage supply using a scope) acknowledges these supply droops, as can be seen by the scope waveform overlaid on the simulated plot waveform (within the dashed box).

Prior solutions to address (or avoid) this problem focused on improving the resources devoted to the power delivery network, in order to minimize the droops caused by the core power transitions. However, these solutions are ineffective in new market segments where the system form factor and cost are becoming the key factors.

A few analog techniques have been employed to reduce power droops but these have been specific to the power supply active schemes of existing products, and therefore cannot be applied to products that utilize a power supply passive scheme (e.g., an external voltage regulator). Other techniques are implemented using architectural core features such as the Alloc Watchdog and reactive throttling schemes. For example, the Alloc Watchdog prompts for a higher voltage margin from the power control unit (PCU) when noticing high power instructions in the pipe. Until the higher margin is achieved, strong performance throttling safeguards against logic failures. The drawbacks of these techniques are significant performance loss until the increased voltage margin is maintained.

Reactive throttling reduces the core pipeline activity by introducing bubble patterns into the high power ports of the core (e.g., floating point math and memory transactions) when detecting a significant power consumption change (determined from the ongoing real time executed instructions in the pipe). The main limitation of this scheme (aside from significant throttling due to false triggering) is that by the time throttling is implemented (following detection and activation, the supply droop has reached close to its full magnitude. Consequently, the droop reduction achieved in practice has not been as large as desired.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
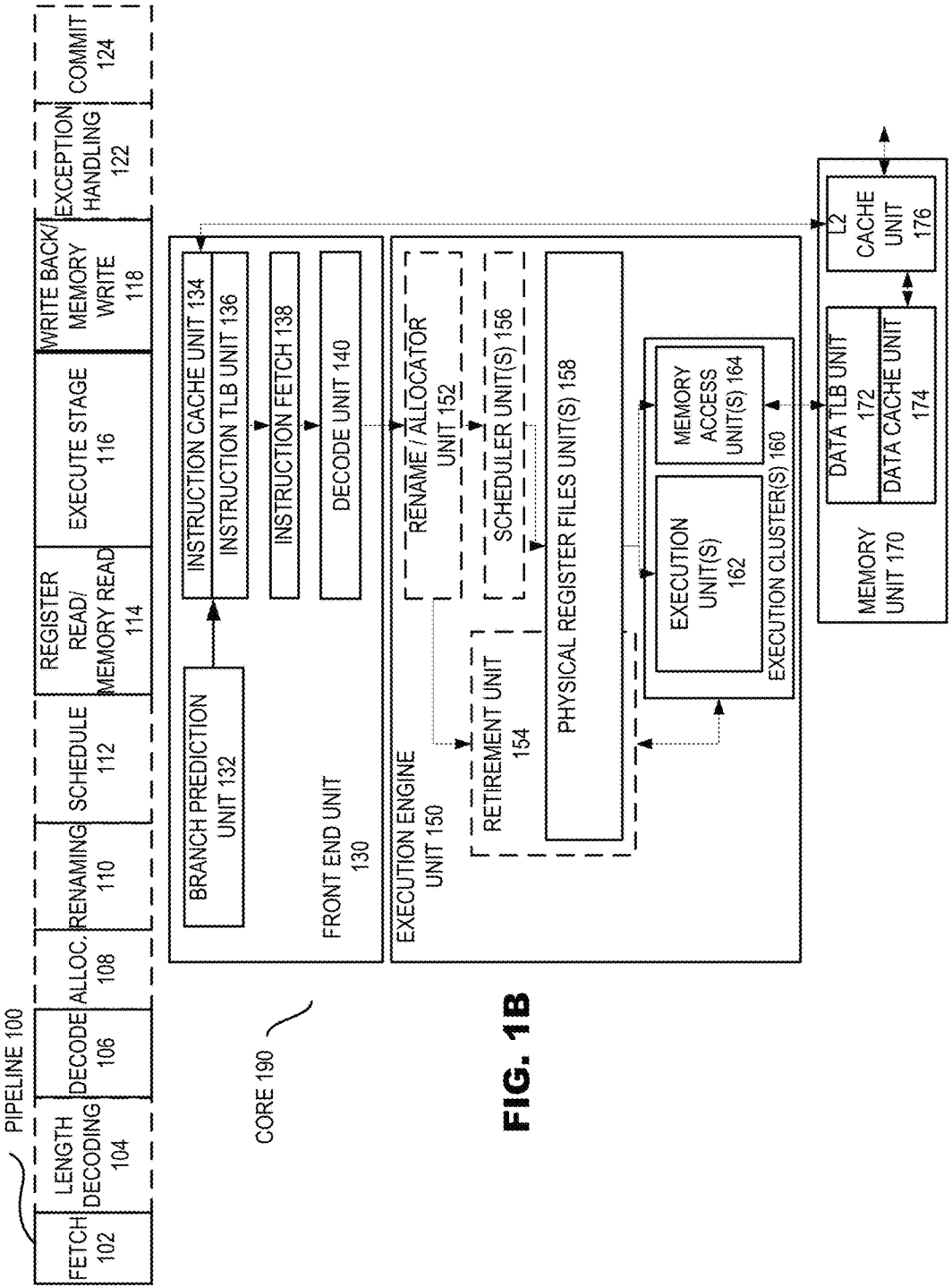
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
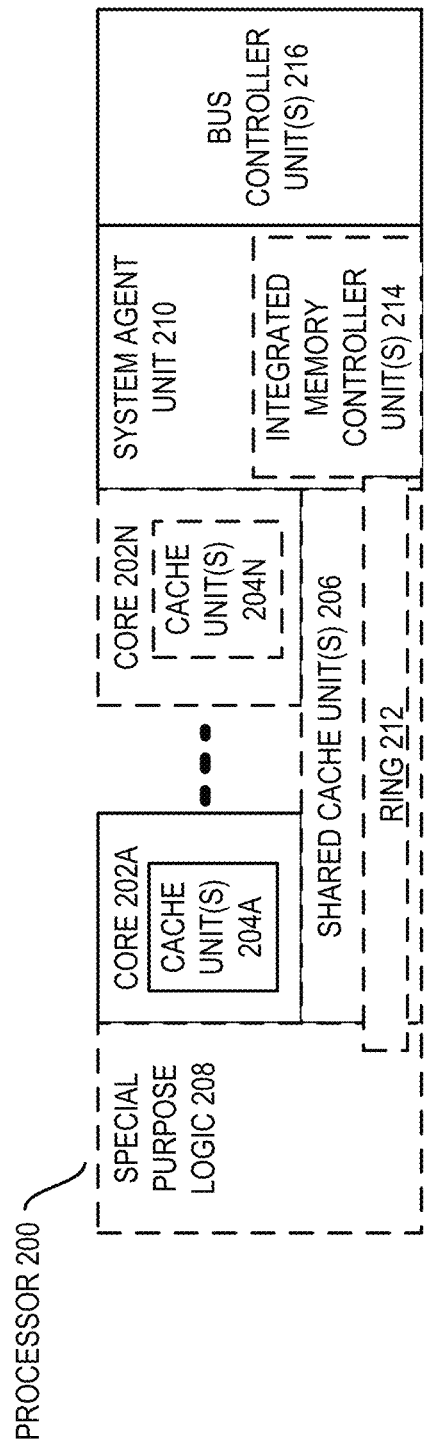
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
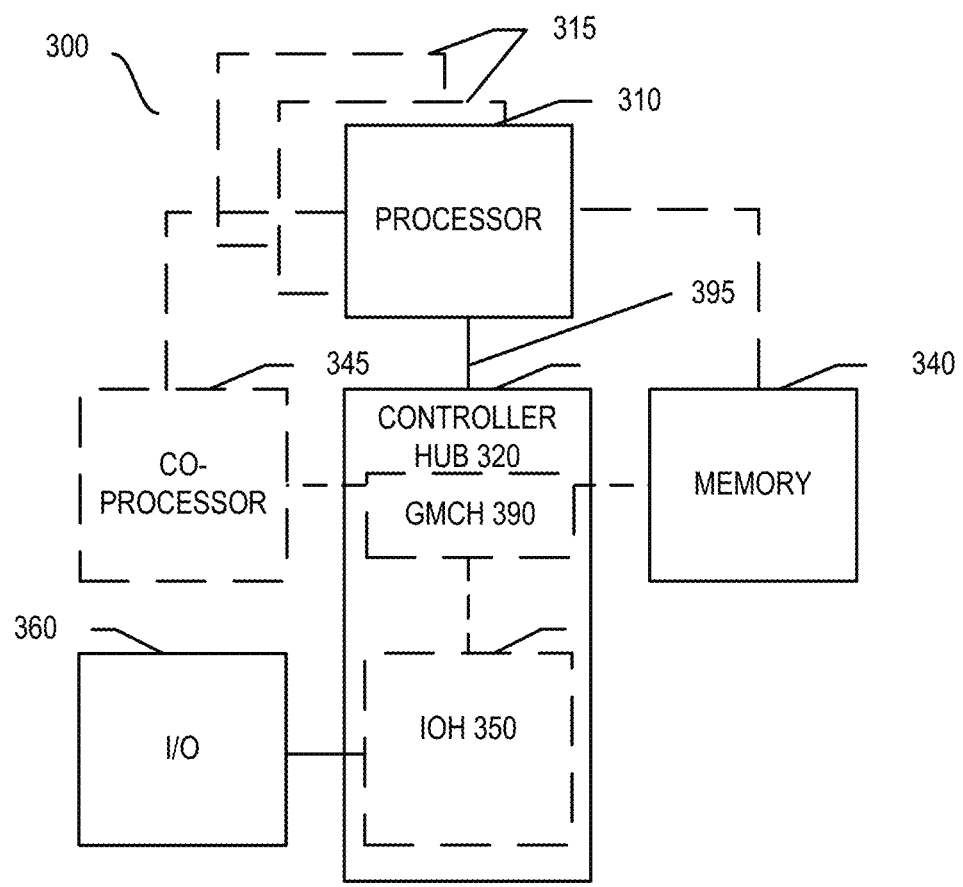
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
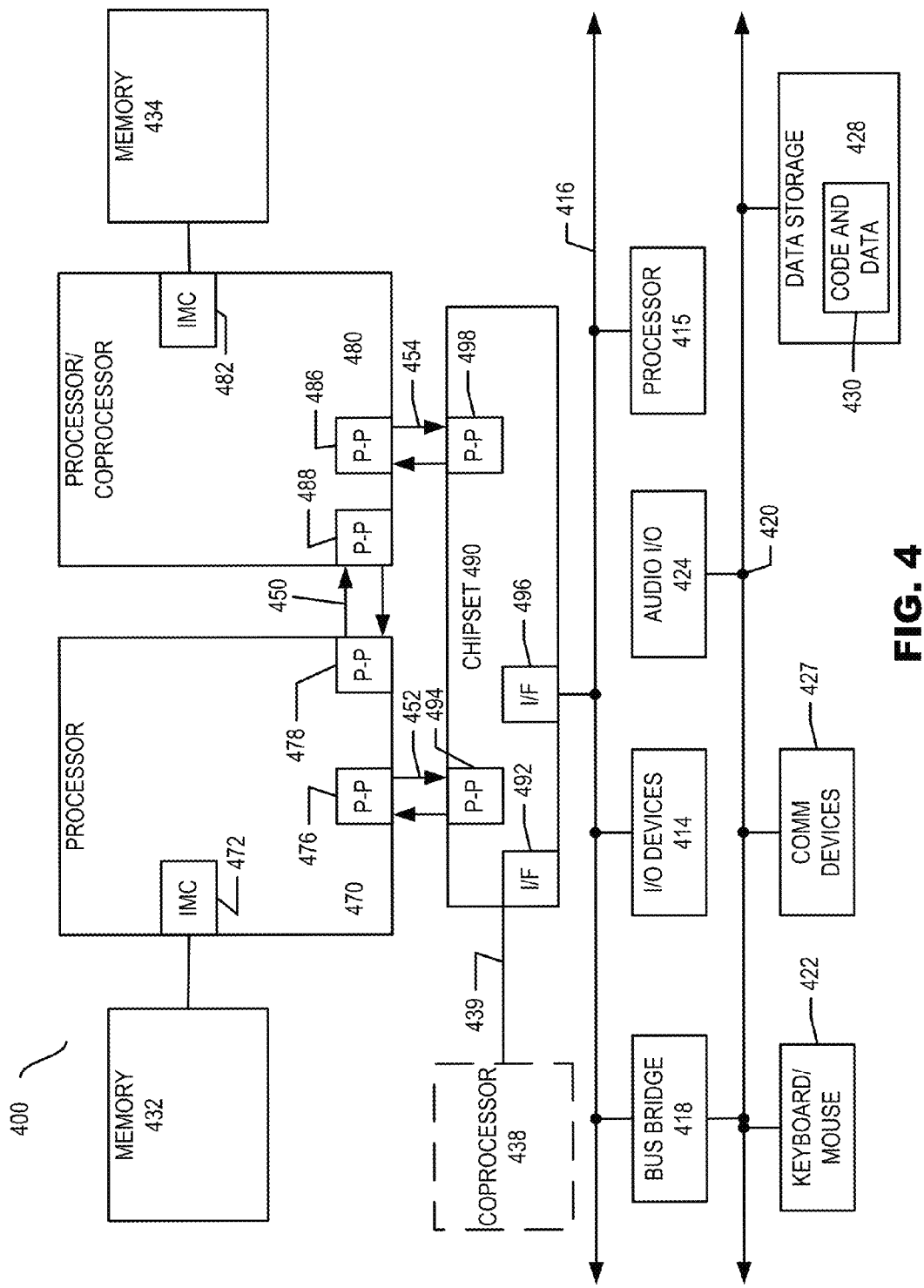
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
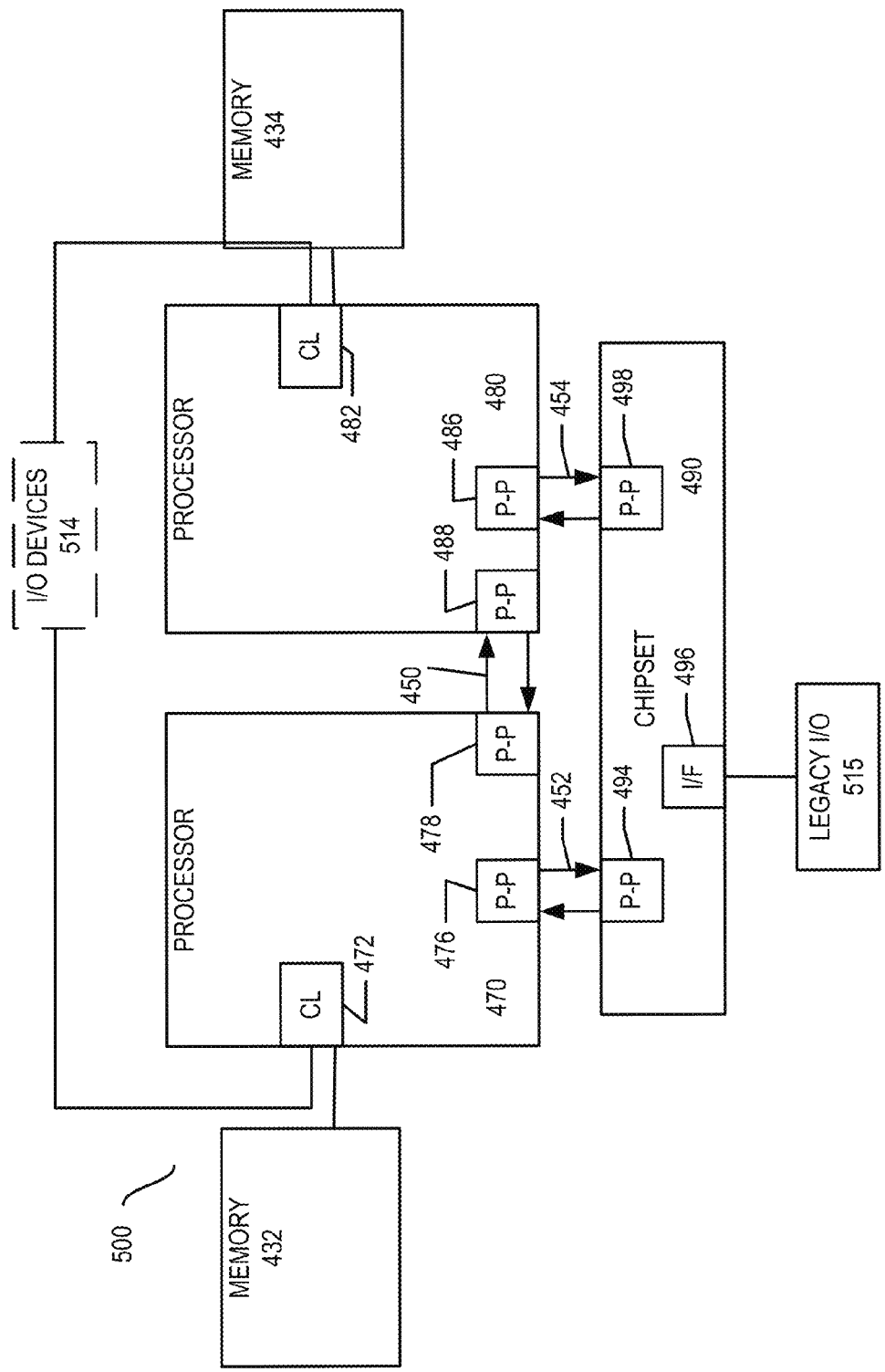
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
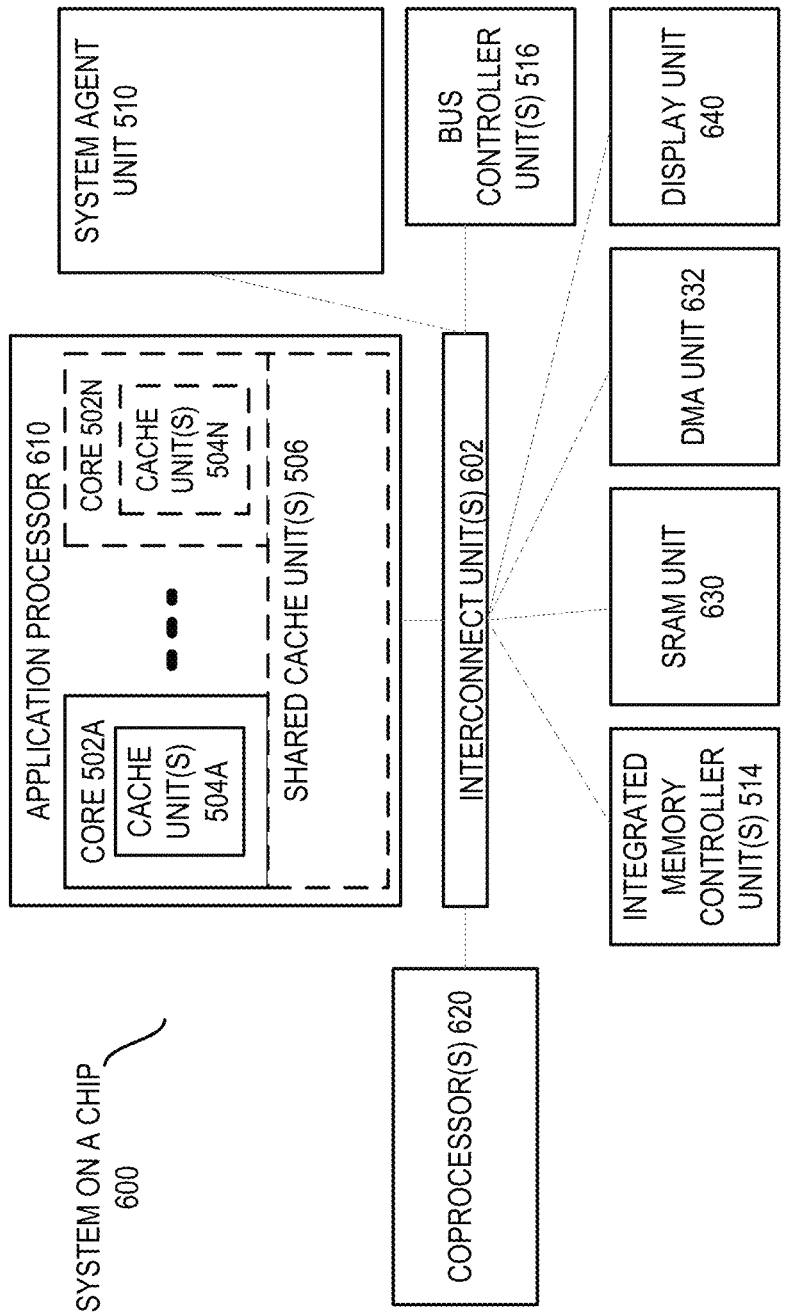
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
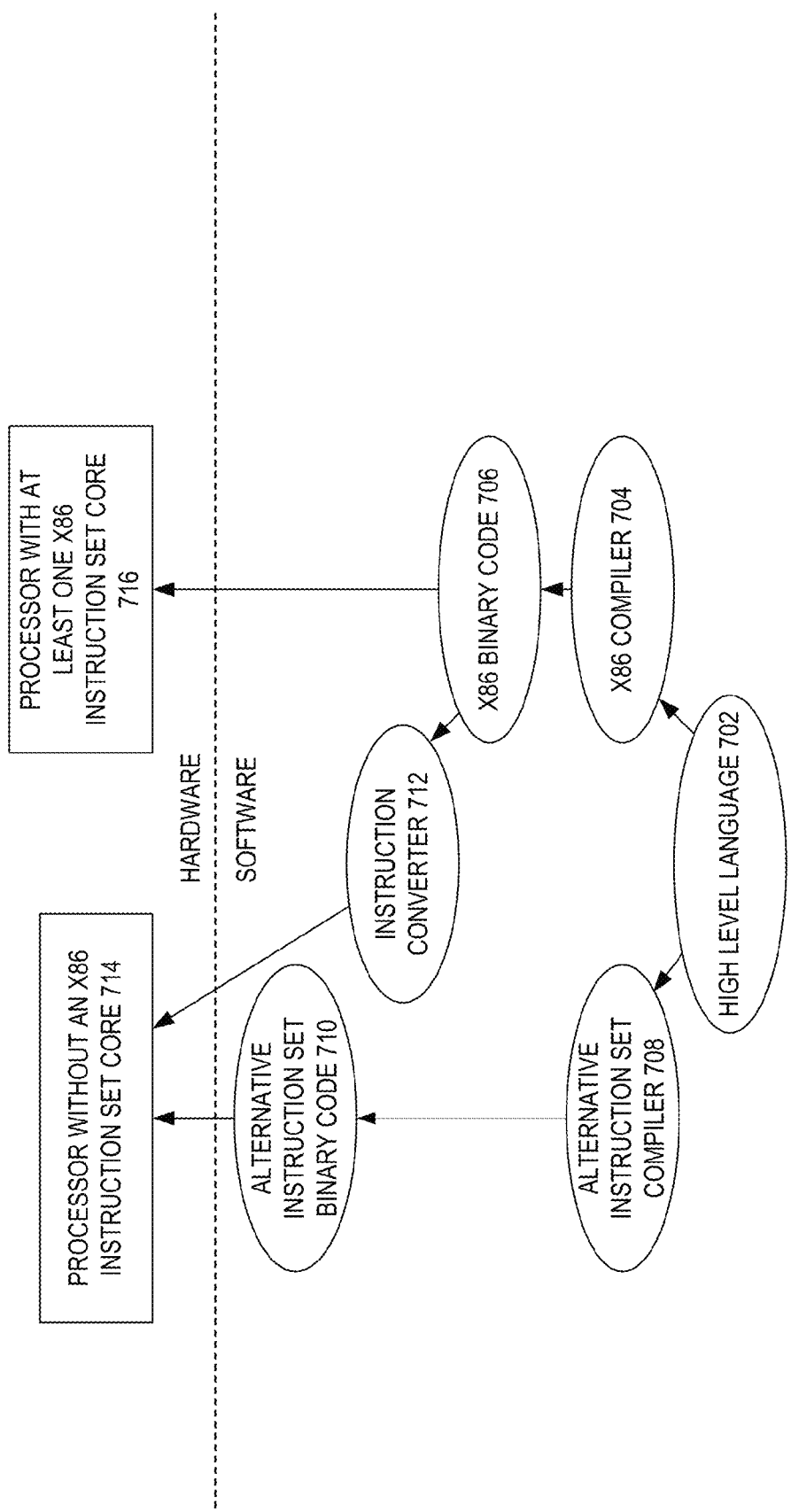
FIG. 7 illustrates a block diagram contrasting the use of a software instruction converter to convert binary instructions in a source instruction set to binary instructions in a target instruction set according to embodiments of the invention.
Figure 8:
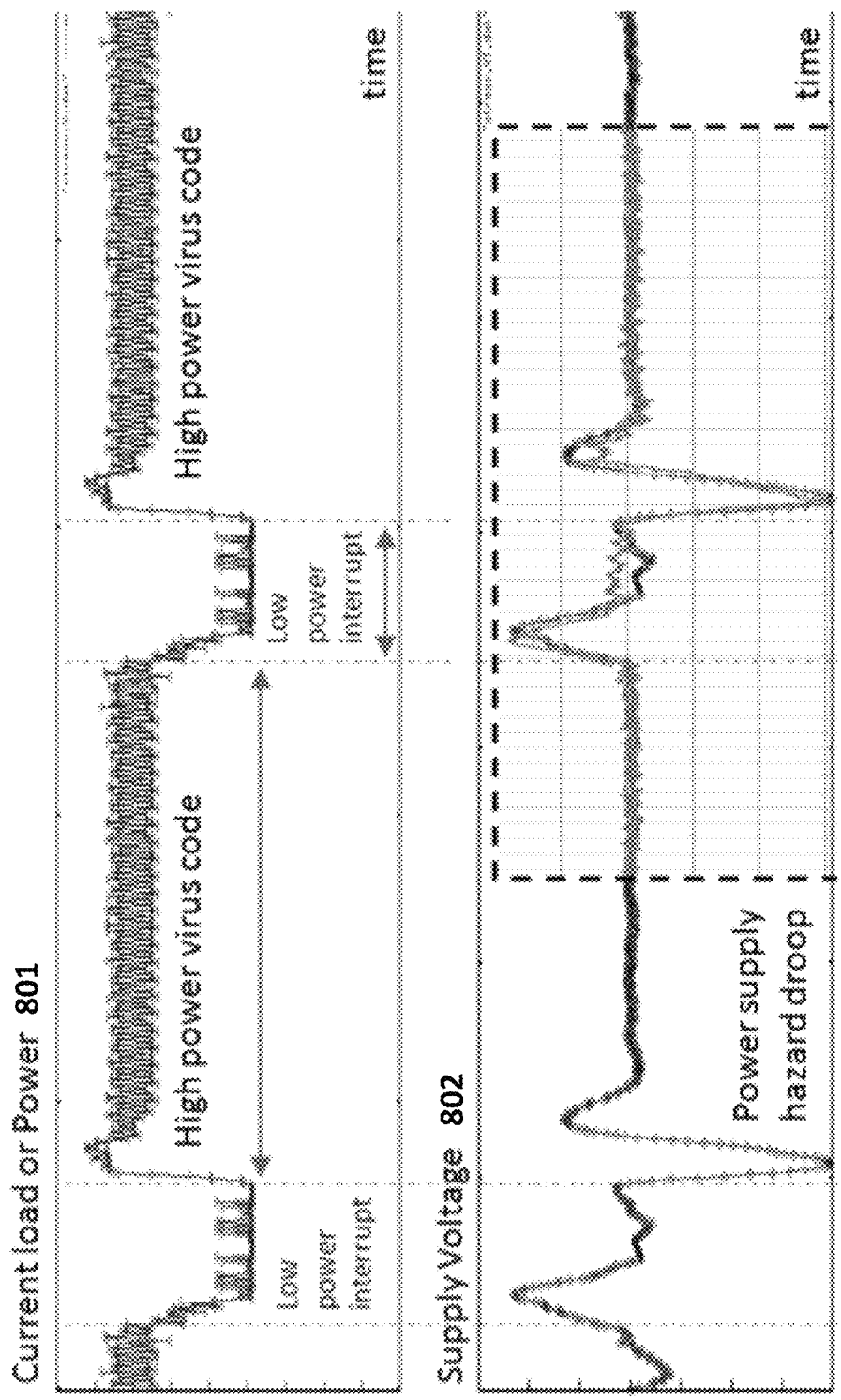
FIG. 8 illustrates a voltage supply droop resulting from a low to high power transition.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Proactive Throttling

One embodiment of the invention implements dynamic throttling techniques to avoid power transients which would otherwise cause a power supply droop. In one embodiment, this is accomplished by proactively throttling the microoperation (uop) activity in the core execution ports to ensure that the core reaches its highest power level in a controlled and gradual manner. In other words, the embodiments described herein limit the acceleration of uop execution by the ports to a level which does not result in significant power supply droops. These embodiments recognize that certain low to high power transients can only be detected after the uops have been scheduled for execution with the core ports. Accordingly, the proactive throttling techniques for detecting execution activity and throttling execution described herein may be implemented following the uop scheduling stage (e.g., within the execution unit).

Figure 9A:
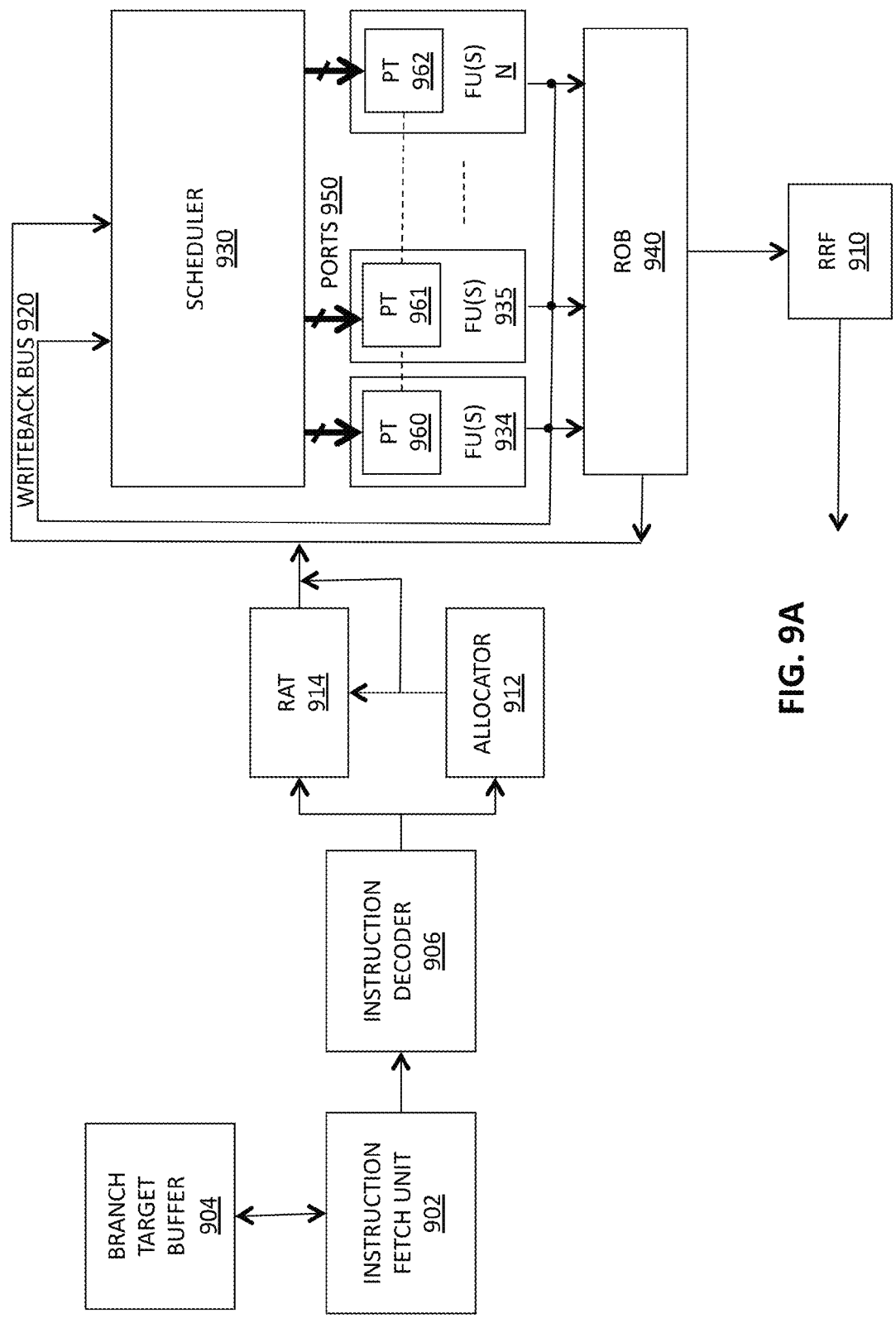
FIGS. 9A-B illustrate system architectures in accordance embodiments of the invention.

FIG. 9A illustrates some of the processor architectural components which may be employed in one embodiment of the invention. In particular, FIG. 9A illustrates a speculative out-of-order microprocessor which may incorporate the embodiments of the invention. The processor comprises an instruction fetch unit (IFU) 902 coupled to a branch target buffer (BTB) 904 and an instruction decoder (ID) 906. Based upon the instruction pointer (IP) provided by the branch target buffer (BTB) 904 to the instruction fetch unit (IFU) 902, the instruction fetch unit (IFU) 902 fetches a macro instruction found at the address in memory (not shown) that is indicated by the IP. The instruction is decoded into one or more micro-operations (uops) by the instruction decoder 906. The instruction decoder 906 transfers the stream of uops to a register alias table (RAT) 914 and an allocator unit 912.

The allocator unit 912 assigns each incoming uop to a location in the reorder buffer (ROB) 940, thereby mapping the logical destination address of the uop to a corresponding physical destination address in the ROB 940. The register alias table (RAT) 914 maintains this mapping.

The contents of a ROB 940 are retired to locations in a real register file (RRF) 910. The RAT 914 thus also stores a real register file valid bit that indicates whether the value indicated by the logical address is to be found at the physical address in the recorder buffer (ROB) or in the RRF after retirement. If found in the RRF, the value is considered to be part of the current processor architectural state. Based upon this mapping, the register alias table (RAT) 914 also associates every logical source address to a corresponding location in the ROB 940 or the RRF 910 (the source operand of one instruction generally must have been the destination of a previous instruction).

Each incoming uop is also assigned and written into an entry in a scheduler unit 930 (e.g., such as a reservation station (RS)) by the allocator 912. The scheduler unit 930 assembles the uops awaiting execution and schedules execution via the ports 950 of an appropriate functional unit 934, 935, N. Various types of functional units 934, 935, N may be employed depending on the processor architecture including, for example, integer execution units, floating point execution units (e.g., floating point add/multiply units), memory execution units (e.g., load/store logic), address generation units, etc. In one embodiment, the each functional unit 934, 935, N includes one or more ports 950 to which the scheduler 930 may dispatch uops for execution. Thus, the number and types of ports 950 exposed by a functional unit represents the execution resources provided by that functional unit for executing uops. Some functional units may be capable of executing multiple uops per clock cycle (and may therefore expose multiple ports 950 to enable such execution), while other functional units may only be capable of executing a single uop per cycle (and therefore only expose a single port). Of course, the underlying principles of the invention are not limited to any particular arrangement of functional units and ports. Regardless of how the functional units and ports are arranged, execution results may be written back to the scheduler unit 930 over a writeback bus 920.

Figure 9B:
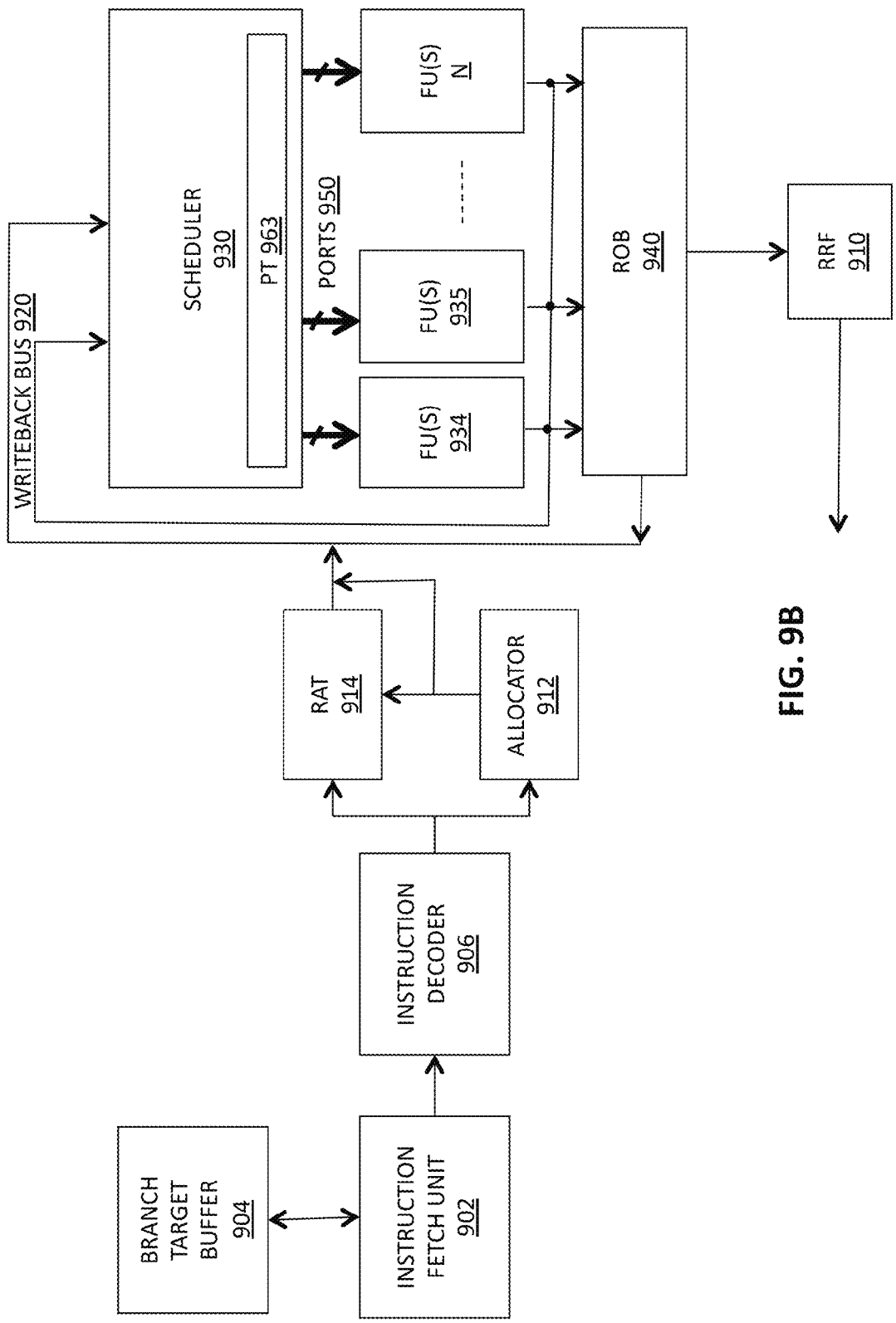

In the embodiment shown in FIG. 9A, each function unit or logical group of functional units 934, 935, N includes port throttling logic 960-962 for throttling uop execution as described herein to ensure that transitions between low and high execution activity occur in a controlled manner which prevents power supply droops. Alternatively, or in addition, as shown in FIG. 9B, the port throttling logic 963 may be integrated within the scheduler unit 930. In yet another embodiment (not shown), the port throttling logic is implemented as a separate logical unit in communication with the functional units 934, 935, N. The underlying principles of the invention are the same regardless of the particular location of the port throttling logic.

In one embodiment, the port throttling logic 960-963 generates an indication of instantaneous executed instruction power which, together with some history record of the same indicator (e.g., a moving sum function of specified size), allows recognizing the power level maintained currently by the core execution engine. In one embodiment, if this activity measure declines below a certain threshold level (parameterized in one implementation) a low activity state is recognized, and protective throttling as described herein is triggered to protect against rapid low-to-high power transitions.

In one embodiment, a "budget scheme" is used to reduce the amount of excessive false warning throttling. The budget scheme calculates the predicted power by the last N instructions and assumes a worst case scenario for those instructions (i.e., the largest possible power) that may follow before protective throttling can be initiated. In this embodiment, if the budget is not exceeded, proactive throttling will not occur even though the power level may be relatively low. This further sophistication of the proactive throttling scheme enables less false throttling than what is required to protect against upcoming low-to-high power transition events.

Figure 10:
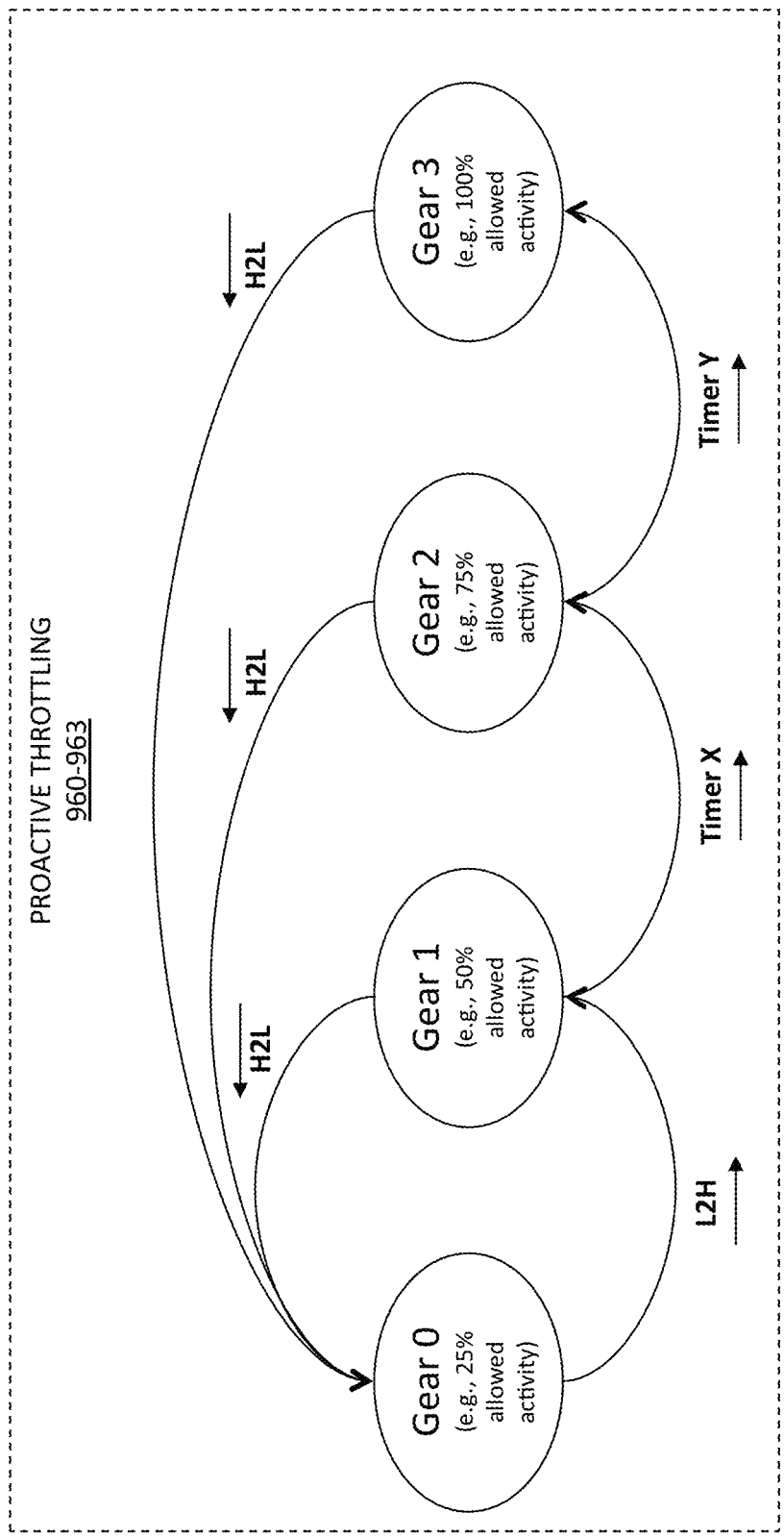
FIG. 10 illustrates one embodiment of a finite state machine employed for proactive throttling.

In one embodiment, the proactive throttling logic 960-963 implements the finite state machine in FIG. 10 to assure a gradual and controlled reduction of the proactive throttling masks imposed upon the functional unit ports, until full execution is allowed. In the illustrated embodiment, the throttling amount is quantized to four states, referred to herein as "Gears 0-3." The lowest state (Gear 0) enforces on average 25% activity of the core pipeline ports; the second state (Gear 1) enforces on average 50% activity of the core pipeline ports; the third state (Gear 2) enforces on average 75% activity of the core pipeline ports; and the last state (Gear 3) allows 100%, or full core port executions.

In one embodiment, jumps are performed between gears based on a current power indicator and set counter duration (parameterized in one embodiment). In one embodiment, the current power indication is calculated based on the number of uops executed per unit of time. Any convenient unit of time may be used such as a specified number of processor cycles and/or a real-time duration (e.g., microseconds, milliseconds, etc). The counter duration may be based on the core clock.

In one embodiment, a jump from 100% to 25% enforced activity is triggered when the power indicator falls below a high to low (H2L) threshold value (e.g., the number of uops per unit of time has decreased below a threshold). In FIG. 10, this is shown as the jump from Gear 3 (100% enabled execution activity) to Gear 0 (25% enabled execution activity). In one embodiment, once in Gear 0, when the power indicator rises above a low-to-high threshold (L2H), the state jumps to Gear 1 (50% enabled activity). Thus, even if a number of uops have been dispatched to ports which would normally result in maximum utilization (e.g., 100%), the proactive throttling state machine limits the low-to-high transition to that specified by Gear 1 (e.g., 50% in the example). As a result, power droops which might result from an instantaneous 25% to 100% transition are inhibited.

In one embodiment, one or more counter-based timers are implemented to ensure a reasonable delay between the transitions from Gear 1 (50%) to Gear 2 (75%) and from Gear 2 to Gear 3 (100%). In particular, the exit Gear exchange process 50%→75%→100% is controlled based on a counter setting that causes the proactive throttling logic to wait a certain number of core clocks until permitting the increase in the activity state of the core ports. In the specific example shown in FIG. 10, "Timer X" specifies the amount of time to wait before transitioning from Gear 1 to Gear 2 and "Timer Y" specifies the amount of time to wait before transitioning from Gear 2 to Gear 3. Limiting the speed with which low-to-high power transitions may occur limits the magnitude of hazard supply droops caused when the slew rate of the transition is very fast, thereby reducing logic failures and/or improving performance.

In one embodiment, the percentage of enabled activity at each gear is controlled by proactive throttling masks imposed upon the functional unit ports. A new mask value is implemented by the proactive throttling logic in response to each transition between gears. At the highest power level (Gear 3), the mask value may be removed or, alternatively, a mask value indicating maximum core activity may be specified.

Figure 11:
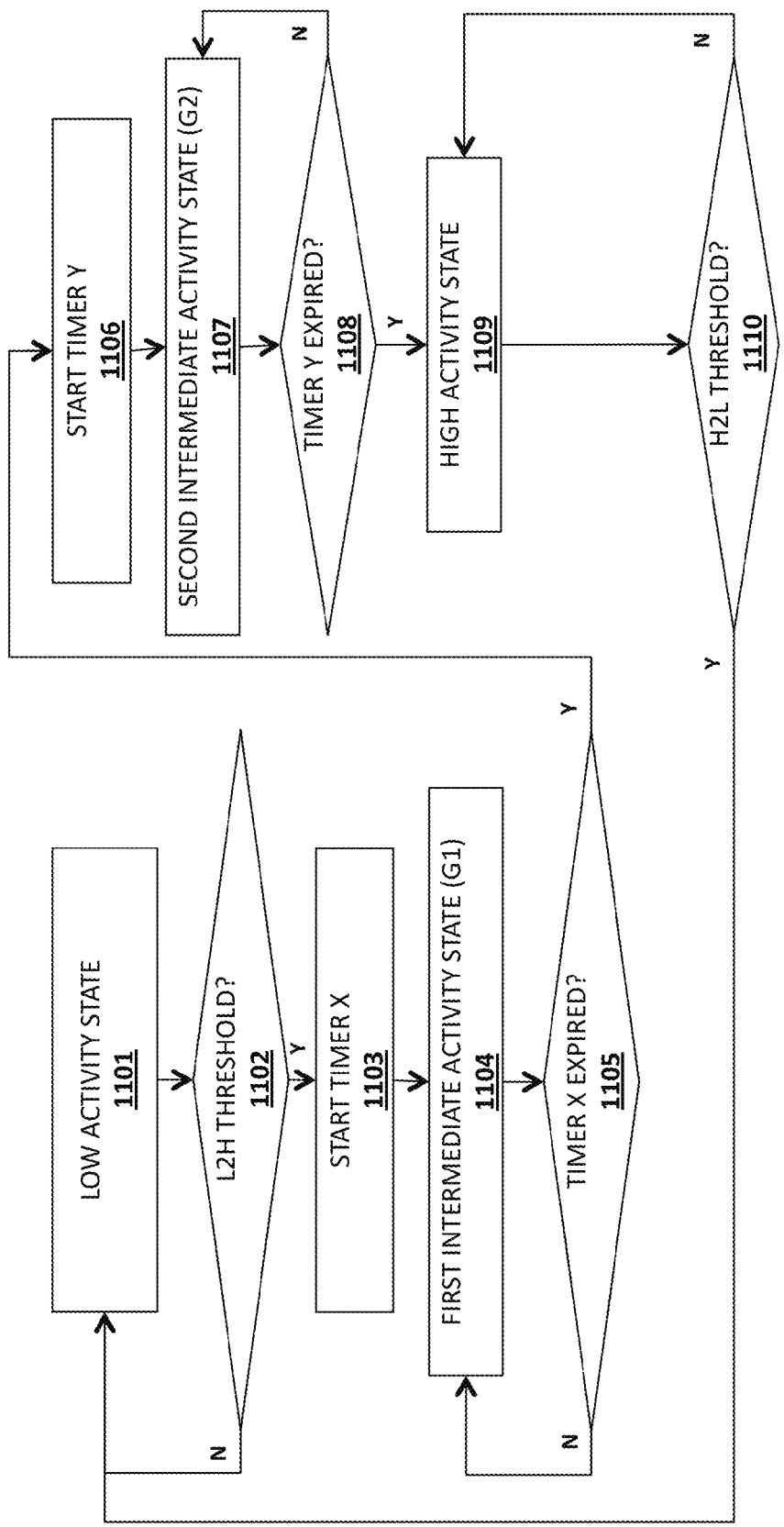
FIG. 11 illustrates one embodiment of a method for proactive throttling.

A method in accordance of one embodiment of the invention is illustrated in FIG. 11. From a low activity state at 1101 (e.g., Gear 0 or 25%), a low to high (L2H) activity threshold is detected at 1102. As mentioned, the L2H threshold may be based on a number of uops detected per unit of time. In response, a first timer (Timer X) is started at 1103 and a first intermediate activity state is entered at 1104 (e.g., Gear 1 or 50%). As mentioned, the timer may be a counter-based timer set to a specified number of core clocks.

As illustrated, the first intermediate activity state is maintained until the timer expires at 1105. In one embodiment, the timer expires when the counter value reaches zero (if counting down) or reaches the specified number of core clocks (if counting up).

In response to the timer expiration, a second timer is started at 1106 (Timer Y). Alternatively, the same timer and associated values may be used for transitions between the different states (i.e., Timer X=Timer Y). At 1107 the second intermediate state is entered at 1107 (e.g., Gear 2 or 75%). Once again, the second timer may be a counter-based timer set to a specified number of core clocks. Only after the second timer expires at 1108 does the system enter for high activity state 1109 (e.g., Gear 3 or 100%).

As previously mentioned, once in the high power state 1109, the system may transition back to the low activity state 1101 in response to detecting the high-to-low (H2L) threshold being reached, determined at 1110 (e.g., when activity drops below a specified H2L threshold).

Figure 12:
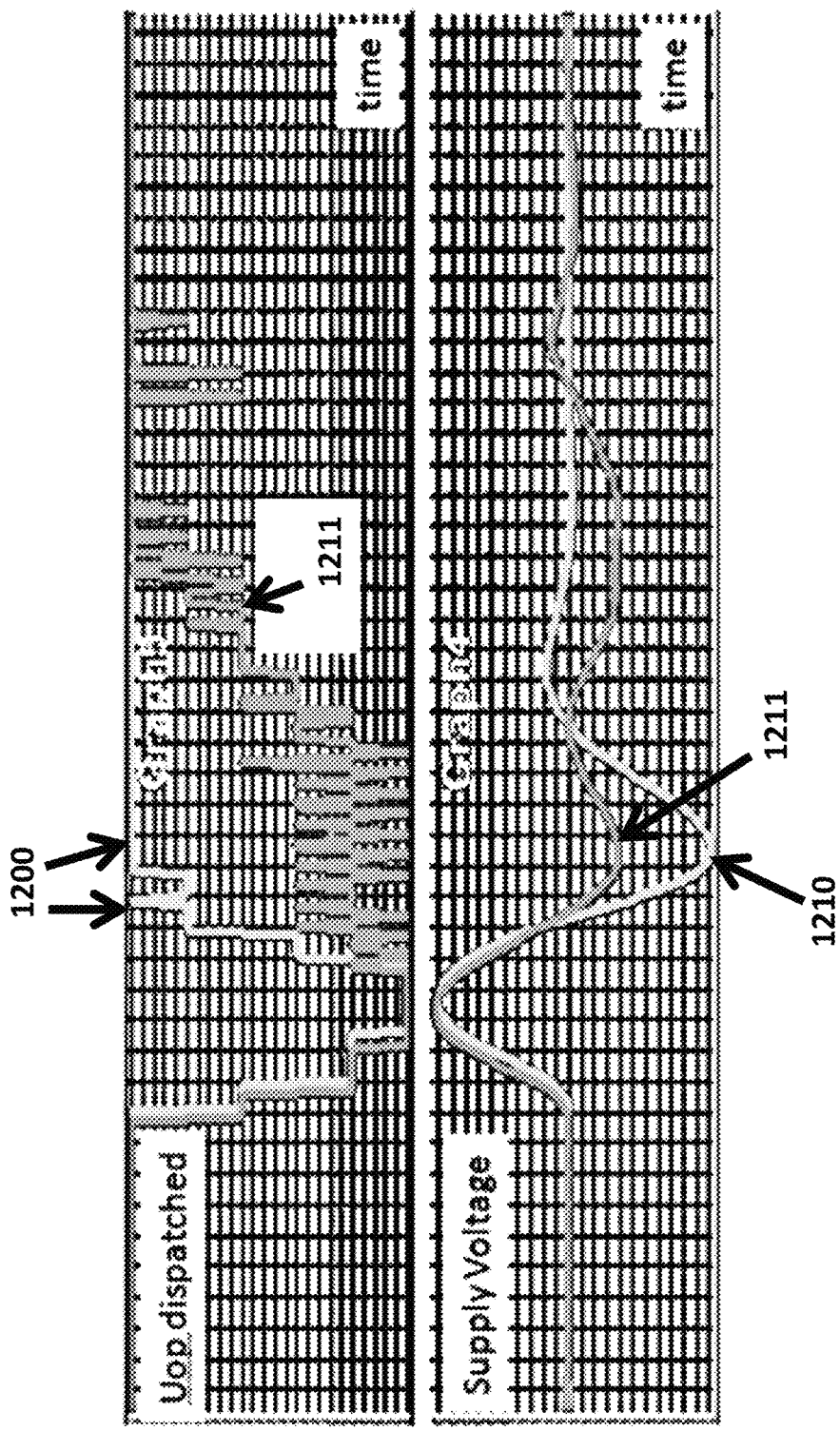
FIG. 12 illustrates uops dispatched and resulting supply voltage response with and without the embodiments of the invention employed.

FIG. 12 illustrates a resulting low-to-high power slew rate damping by the techniques described herein. The upper plot ("Uop dispatched") indicates the chip power consumption in the form of high power uops being dispatched for execution in each clock cycle. The yellow line 1200 shows the unconstrained, code-driven rise of uops from a low power interrupt code event (which is unprotected as it causes a supply voltage overshoot which is not considered a hazard). The rise of uops at 1200 causes a significant supply droop at 1210.

In contrast, with proactive throttling applied to the core ports, the light blue line 1211 shows that the increase of uop dispatch and execution is more gradual. The throttling exhibits strong damping of the power rise as shown at 1211. By way of example, the core may attempt to launch many parallel sets of instructions. However, the proactive throttling techniques described herein result in a gradual and controlled increase of uop execution until full steam execution is reestablished.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor core comprising:
    a plurality of execution unit ports within an execution stage of the processor core;
    a scheduler circuitry to schedule execution of a plurality of operations to the plurality of execution unit ports;
    proactive throttling logic circuitry to limit acceleration of execution of the operations by each of the execution unit ports to an acceleration level which does not result in significant power supply droops, wherein the proactive throttling logic circuitry is configured to detect a low-to-high transition of operation execution by the ports and responsively raise the speed with which the operations are executed by the ports to a first threshold level;
    a first timer to set a first time period during which operation execution is to remain at the first threshold level, wherein at the end of the first time period, the proactive throttling logic is to responsively raise the speed with which the operations are executed by the ports to a second threshold level; and
    a second timer or the first timer configured to set a second time period during which operation execution is to remain at the second threshold level, wherein at the end of the second time period, the proactive throttling logic is to responsively raise the speed with which the operations are executed by the ports to a third threshold level.

2. The processor core as in claim 1 wherein the operations comprise microoperations, the processor core further comprising:
a decoder to decode macro instructions into a plurality of microoperations, the proactive throttling logic to limit acceleration of microoperation execution by the ports.

3. The processor core as in claim 1 wherein the first threshold level comprises a first percentage of a maximum operation execution level.

4. The processor core as in claim 1 wherein the first percentage comprises 50% of the maximum operation execution level.

5. The processor core as in claim 1 wherein the second threshold level comprises a second percentage of a maximum operation execution level which is greater than a first percentage defining the first threshold.

6. The processor core as in claim 1 wherein the first percentage if 50% and the second percentage is 75%.

7. The processor core as in claim 1 wherein the third threshold level is a maximum operation execution level.

8. The processor core as in claim 1 wherein the first time period and the second time period are equal.

9. A method comprising:
scheduling execution of a plurality of operations to a plurality of execution unit ports within an execution stage of a processor core;
performing proactive throttling on each of the execution unit ports to limit acceleration of operation execution by the execution unit ports to an acceleration level which does not result in significant power supply droops, wherein the proactive throttling is configured to detect a low-to-high transition of operation execution by the ports and responsively raise the speed with which the operations are executed by the ports to a first threshold level;
setting a first time period during which operation execution is to remain at the first threshold level, wherein at the end of the first time period, the proactive throttling logic is to responsively raise the speed with which the operations are executed by the ports to a second threshold level; and
setting a second time period during which operation execution is to remain at the second threshold level, wherein at the end of the second time period, the proactive throttling logic is to responsively raise the speed with which the operations are executed by the ports to a third threshold level.

10. The method as in claim 9 further comprising:
a decoder to decode macro instructions into a plurality of microoperations, the proactive throttling logic to limit acceleration of microoperation execution by the ports.

11. The method as in claim 9 wherein the first threshold level comprises a first percentage of a maximum operation execution level.

12. The method as in claim 9 wherein the first percentage comprises 50% of the maximum operation execution level.

13. The method as in claim 9 wherein the second threshold level comprises a second percentage of a maximum operation execution level which is greater than a first percentage defining the first threshold.

14. The method as in claim 9 wherein the first percentage if 50% and the second percentage is 75%.

15. The method as in claim 9 wherein the third threshold level is a maximum operation execution level.

16. The method as in claim 9 wherein the first time period and the second time period are equal.

17. A system comprising:
a memory for storing program code and data;
a input/output (10) communication interface for communicating with one or more peripheral devices;
a network communication interface for communicatively coupling the system to a network; and
a processor having at least one processor core comprising:
a plurality of execution unit ports within an execution stage of the processor core;
a scheduler circuitry to schedule execution of a plurality of operations to the plurality of execution unit ports;
proactive throttling logic circuitry to limit acceleration of execution of the operations by each of the execution unit ports to an acceleration level which does not result in significant power supply droops, wherein the proactive throttling logic circuitry is configured to detect a low-to-high transition of operation execution by the ports and responsively raise the speed with which the operations are executed by the ports to a first threshold level;
a first timer to set a first time period during which operation execution is to remain at the first threshold level, wherein at the end of the first time period, the proactive throttling logic is to responsively raise the speed with which the operations are executed by the ports to a second threshold level; and
a second timer or the first timer configured to set a second time period during which operation execution is to remain at the second threshold level, wherein at the end of the second time period, the proactive throttling logic is to responsively raise the speed with which the operations are executed by the ports to a third threshold level.

18. The system as in claim 17 wherein the operations comprise microoperations, the processor core further comprising:
a decoder to decode macro instructions into a plurality of microoperations, the proactive throttling logic to limit acceleration of microoperation execution by the ports.

19. The system as in claim 17 wherein the first threshold level comprises a first percentage of a maximum operation execution level.

* * * * *